United States Patent
Lee

[11] Patent Number: 5,988,827
[45] Date of Patent: Nov. 23, 1999

[54] DISPLAY DEVICES HAVING ROUNDED CORNER BACKLIGHT UNIT

[75] Inventor: Ik-Soo Lee, Kyungki-do, Rep. of Korea

[73] Assignee: Samsung Electronics Co., Ltd., Rep. of Korea

[21] Appl. No.: 08/847,017

[22] Filed: May 1, 1997

[30] Foreign Application Priority Data

Jul. 11, 1996 [KR] Rep. of Korea ................. 96-27918

[51] Int. Cl.[6] ............ F21V 7/04; G01D 11/28; G02F 1/1335
[52] U.S. Cl. ............... 362/31; 362/26; 362/29; 362/330; 362/812; 349/58; 349/61; 349/65; 385/901
[58] Field of Search .............. 362/31, 23, 26, 362/29, 330, 812; 385/901; 353/122; 349/56, 58, 61, 62, 64, 65, 67

[56] References Cited

U.S. PATENT DOCUMENTS

| | | | |
|---|---|---|---|
| 4,025,162 | 5/1977 | Yagi | 349/58 |
| 4,929,062 | 5/1990 | Guzik et al. | 362/31 X |
| 5,050,046 | 9/1991 | Tada | 362/26 |
| 5,070,431 | 12/1991 | Kitazawa et al. | 362/31 |
| 5,228,223 | 7/1993 | Lan | 362/31 X |
| 5,239,450 | 8/1993 | Wall | 362/31 X |
| 5,335,100 | 8/1994 | Obata | 349/58 X |
| 5,579,598 | 12/1996 | Fallon et al. | 362/31 X |
| 5,613,751 | 3/1997 | Parker et al. | 362/31 |
| 5,653,522 | 8/1997 | Loucks | 353/122 |
| 5,746,493 | 5/1998 | Jonnson et al. | 362/31 |
| 5,769,521 | 6/1998 | Osawa et al. | 362/27 |
| 5,815,227 | 9/1998 | Lee | 362/31 X |

FOREIGN PATENT DOCUMENTS

| | | | |
|---|---|---|---|
| 5-19228 | 1/1993 | Japan | 349/58 |

Primary Examiner—Ira S. Lazarus
Assistant Examiner—Ljiljana V. Ciric
Attorney, Agent, or Firm—Myers Bigel Sibley & Sajovec

[57] ABSTRACT

A backlight unit for a display device includes a mold frame and a light guide panel. The mold frame includes a groove having at least one rounded corner. The light guide panel is on the mold frame and includes a light guide projection in the groove, having at least one rounded corner corresponding to the at least one rounded corner of the mold frame groove.

14 Claims, 4 Drawing Sheets

5,988,827

DISPLAY DEVICES HAVING ROUNDED CORNER BACKLIGHT UNIT

FIELD OF THE INVENTION

This invention relates to display devices, and more particularly to backlight units for display devices.

BACKGROUND OF THE INVENTION

Display devices are widely used in many consumer and commercial applications. Display devices generally use light in order to display a visible image, especially in the dark. As is well known, display devices generally include active displays in which every picture element (pixel) emits light, and passive displays which use a source of light to project through the display panel. The source of light may be supplied by a backlight unit. Examples of active displays are cathode ray tubes (CRT) and light emitting diode (LED) displays. An example of a passive display is a liquid crystal display (LCD).

A backlight unit of an LCD will now be described. Backlight units generally include a light source such as a lamp, a reflecting sheet, a light guide panel and a diffusing sheet. The backlight unit and the display panel are generally enclosed within a mold frame and a top chassis.

FIGS. 1, 2, 3 and 4 illustrate a conventional backlight unit of an LCD. FIG. 1 is a top view of a conventional LCD module. Referring to FIG. 1, the image of the LCD is displayed on the area marked with dotted lines. This area is generally called the active area, and the outside of the active area is enclosed with a top chassis 8. It is generally desirable to reduce the distance A between the top chassis 8 and the active area, in order to provide compact LCDS.

FIG. 2 is a cross-sectional view illustrating a conventional LCD module. Referring to FIG. 2, a conventional LCD has a light guide panel 2 which guides light to a display panel. Two diffuser sheets 3 (or diffuser and prism sheets) are mounted over the light guide panel 2. A display panel including a thin film transistor (TFT) substrate 4 and a color filter substrate 5 is mounted over these diffuser sheets. The TFT substrate 4 is connected to a PCB (Printed Circuit Board) substrate 6 having TAB IC (Tape Automated Bonding Integrated Circuit) 7. The light guide panel 2, diffuser sheets 3, TFT substrate and PCB substrate are mounted in the grooves of a mold frame 1. The mold frame 1 is combined with the top chassis 8, thereby holding and protecting the display panel and the backlight unit. Since the module size becomes smaller as the distance A is reduced, the distance B between the mold frame 1 and the active area also is generally reduced.

FIG. 3 is a top view of the inside construction of a conventional backlight unit. Referring to FIG. 3, the mold frame 1 is grooved so that a light source 9, the guide panel 2 and the PCB substrate 6 may be mounted thereon. The light guide panel 2 is mounted in the middle of the mold frame 1 and the lamp 9 is horizontally mounted on one side of the mold frame 1. Generally, there is some space between the lamp 9 and the light guide panel 2 so that the light guide panel 2 can receive light from the lamp 9 and send light to the display panel. Therefore, it is possible to damage the lamp when the LCD module is shaken or external forces are imparted to the LCD module.

To solve this problem, the light guide panel 2 includes a light guide projection 10 and a side of the mold frame includes a groove 11. The light guide projection 10 of the light guide panel 2 can thus be fitted to the groove 11 so that the mold frame can fixedly hold the light guide panel 2.

FIG. 4 is an enlarged diagram illustrating light concentration in a portion D of FIG. 3. Referring to FIG. 4, light is concentrated in the right-angled corners 10a, 10b of the light guide projection 10. When light from the lamp reaches the boundary of the light guide projection, light is partially reflected and partially transmitted to the mold frame 1. When light reaches the mold frame 1, light is reflected and is sent back to the boundary of the light guide panel 2. Then, light is partially reflected to air C and partially transmitted to the inside of the light guide panel 2. Reflection and transmission of light are repeated in air C between the light guide panel 2 and the mold frame 1, so that light may be concentrated at the corners 10a, 10b of the light guide projection 10 of the light guide panel 2.

As a result of this concentration, the light guide projection 10 of the light guide panel 2 may be brighter compared to other portions. The concentrated light may result in a poor quality LCD. Moreover, as the distance A between the module and active area is reduced, the light concentration may increase.

SUMMARY OF THE INVENTION

It is therefore an object of the present invention to provide improved backlight units for display devices.

It is another object of the present invention to provide light guide panels and backlight units which can reduce light concentration in a light guide projection thereof.

These and other objects are provided, according to the present invention, by a backlight unit for a display device having a mold frame including a groove and having a light guide panel including a light projection mounted in the groove, wherein the mold frame groove and light guide projection each include at least one rounded corner. The rounded corner can prevent light from being concentrated at the corners of the projecting portion.

In particular, a backlight unit for a display device includes a mold frame and a light guide panel. The mold frame includes a groove having at least one rounded corner. The light guide panel is mounted on the mold frame and includes a light guide projection mounted in the groove. The light guide projection includes at least one rounded corner corresponding to the at least one rounded corner of the mold frame groove.

A light source is also mounted on the mold frame in spaced apart relation from the light guide panel. In this configuration, the mold frame groove and the light guide panel both include a first corner and a second corner which is remote from the light source relative to the first corner. The first corner is preferably angled and the second corner is preferably rounded. Thus, the first angled corner may effectively prevent the light guide panel from damaging the light source. The second corner may be used to reduce light concentration from the light source and thereby improve the quality of the LCD. In other embodiments, the groove and the light guide projection are both free of all sharp angles. In other embodiments, both the first and second corners may be rounded.

The backlight unit may be combined with an array of display elements on the light guide panel, opposite the mold frame, to form a flat panel display device. A diffuser may be included between the light panel and the array of display elements. A printed circuit board may also be included on the mold frame and may include a plurality of integrated circuits which are electrically connected to the array of display elements.

Accordingly, the present invention can prevent the light source from being destroyed during movement of the LCD, by fitting the light guide projection into grooves in the mold frame. The present invention also can reduce or eliminate light concentration at portions of the LCD by rounding the corners of the projection and light guide panel.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 5:
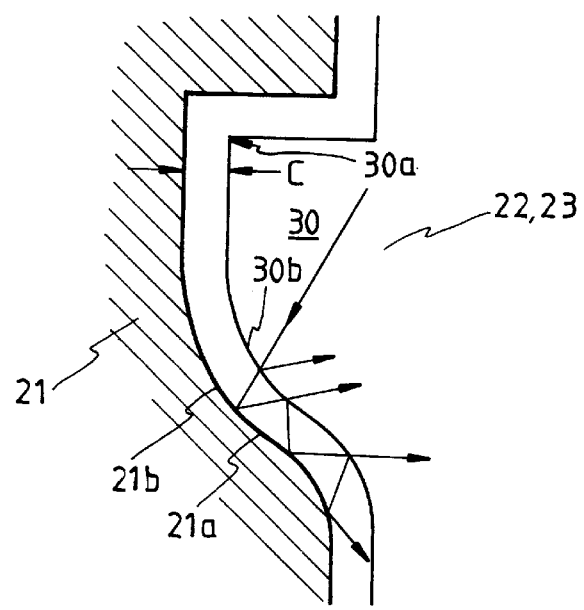
FIG. 5 is a diagram illustrating a light guide projection of a light guide panel of an LCD in accordance with the present invention.

Referring now to FIG. 5, a mold frame 21 includes a concave groove 21a in its side so that light guide projection 30 of the light guide panel 22 fits into the groove 21a. The light guide projection 30 of the light guide panel 22 has at least one rounded corner 30b, and the groove 21a of the mold frame also has at least one rounded corner 21b corresponding to the shape of the projecting portion. A pair of diffuser sheets 23 (or a diffuser sheet and a prism) having similar shape as the light guide panel 22, are mounted on the light guide panel.

Figure 1:
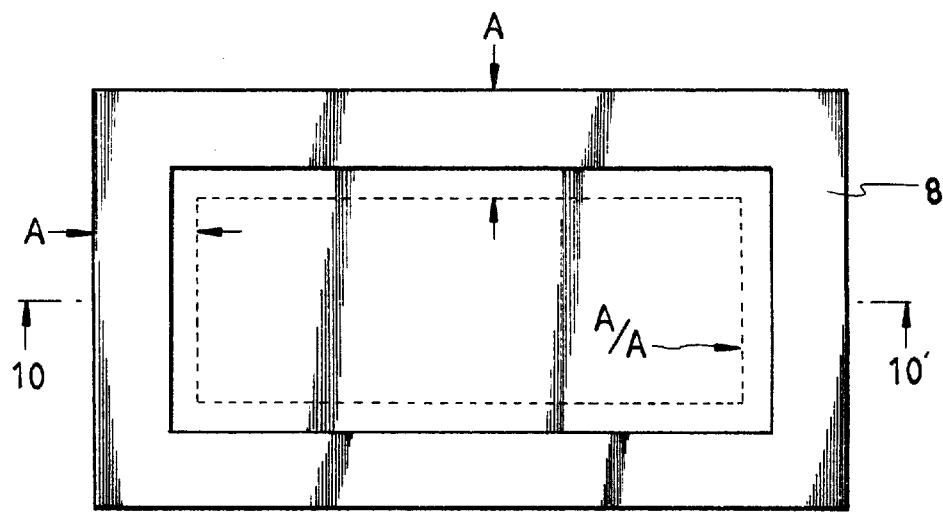
FIG. 1 is a top view of a conventional LCD module.
Figure 2:
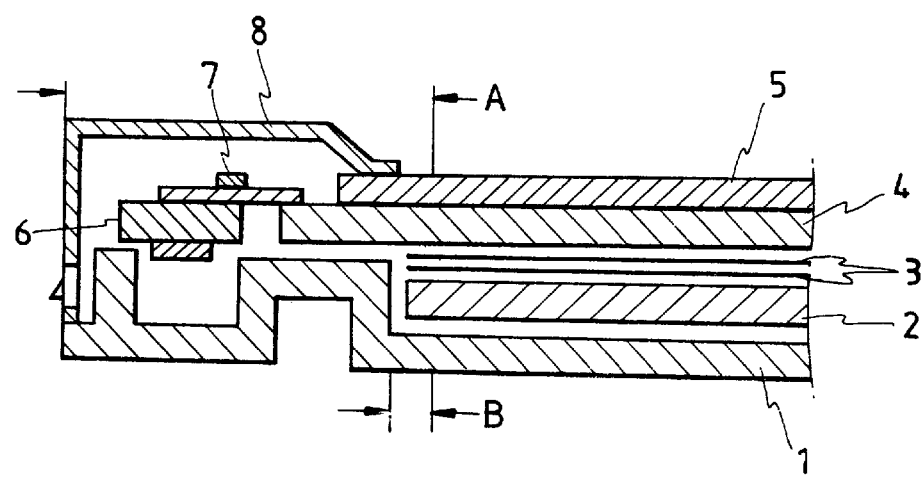
FIG. 2 is a cross-sectional view illustrating a conventional LCD module.
Figure 3:
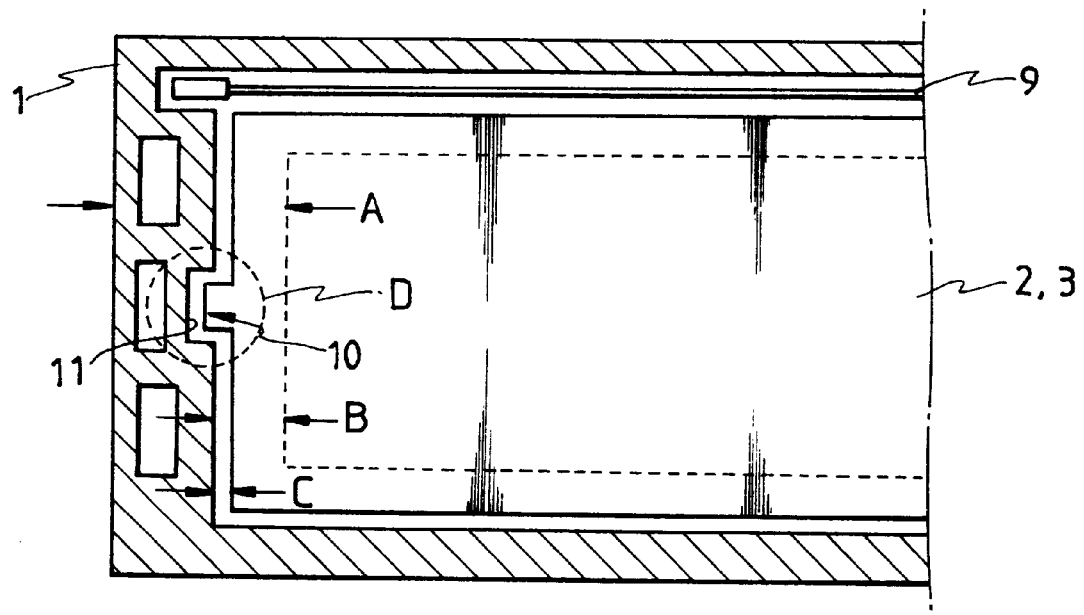
FIG. 3 is a top view of a backlight unit of a conventional LCD.
Figure 4:
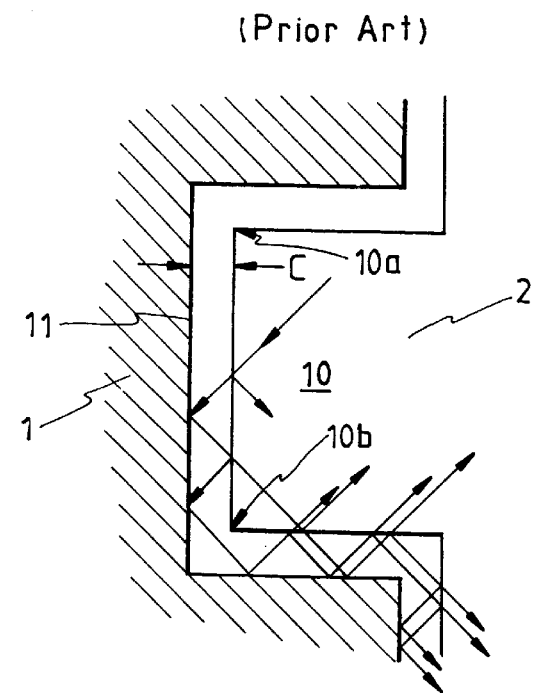
FIG. 4 is a diagram illustrating a light guide projection of a light guide panel of a conventional LCD.
Figure 6:
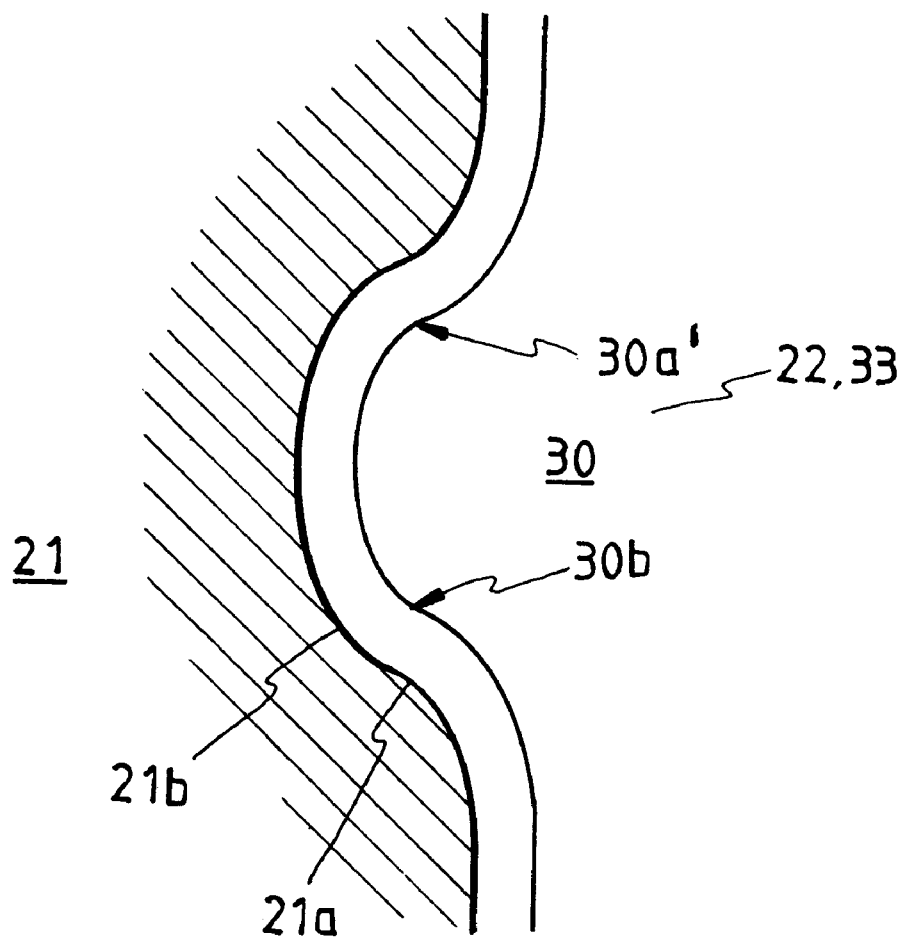
FIG. 6 is a diagram illustrating an alternate embodiment of a light guide projection of a light guide panel of an LCD in accordance with the present invention.

It is preferable to make the corner 30b of the projected portion 30, which is remote from the lamp 9 of FIG. 3, round in order to efficiently prevent light from being concentrated. For example, when the lamp is mounted above the light guide panel 22, the light guide projection 30 of the light guide panel 22 has an upper corner 30a which is right-angled and a lower corner 30b which is rounded. As shown in FIG. 6, however, the projected portion 30 may have two rounded corners 30a', 30b. As also shown in FIG. 6, the groove 21a and the light guide projection 30 may both be free of sharp angles.

When light from the lamp reaches the boundary of the light guide projection 30, light is partially reflected to the light guide panel and partially transmitted to the air C. Light which passes through the air layer C is again reflected to the boundary of the light guide panel when it reaches at the boundary of the mold frame. The reflection and the transmission of light are repeatedly carried out in the air C between the mold frame 21 and the light guide panel 22. Since light guide projections 30 of light guide panels in accordance with the present invention include at least one rounded corner, light which is reflected into the light guide panel 22 may be dispersed. In addition, light guide panels having at least one rounded corner can reduce the amount of light reflected into the light guide panel.

Accordingly, a backlight unit of a display device in accordance with the present invention can prevent light from being concentrated, thereby improving the quality of the LCD by rounding the light guide panel projection.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A mold frame for a display device comprising:
   means for receiving a display device light source;
   means for receiving a display device light guide panel such that the light guide panel is disposed adjacent and spaced apart from the light source; and
   means for fixing the light guide panel in spaced apart relation to the light source, the fixing means including at least one rounded corner, the rounded corner operative to reduce non-uniform concentration of light from the light source in the light guide panel.

2. A mold frame according to claim 1 wherein the fixing means comprises a groove including at least one rounded corner.

3. A mold frame according to claim 2 wherein the groove is entirely rounded.

4. A mold frame according to claim 1:
   wherein the fixing means includes a first corner, and a second corner which is spaced farther from the means for receiving a display device light source than the first corner is spaced from the means for receiving a display device light source; and
   wherein the first corner is angled and the second corner is rounded.

5. A backlight unit for a display device comprising:
   a mold frame which includes a groove having at least one rounded corner;
   a light source on the mold frame, said light source being operative to provide light; and
   a light guide panel on the mold frame in spaced apart relation from the light source, including a light guide projection in the groove, the light guide projection having at least one rounded corner corresponding to the at least one rounded corner of the mold frame groove, the rounded corners of the mold frame groove and the light guide projection being cooperative to maintain the light guide panel and the light source in spaced relation, the at least one rounded corner of the light guide projection being operative to reduce concentration of the light in the light guide projection.

6. A backlight unit according to claim 5:
   wherein the mold frame groove and the light guide panel both include a first corner, and a second corner which is spaced farther from the light source than the first corner is spaced from the light source;
   wherein the first corners are angled and the second corners are rounded; and
   wherein the first corner of the light guide panel is disposed adjacent the first corner of the mold frame groove and the second corner of the light guide panel is disposed adjacent the second corner of the mold frame groove.

7. A backlight unit according to claim 5 wherein the groove and light guide projection are both entirely rounded.

8. The backlight unit according to claim 5 wherein the light guide panel defines a peripheral edge, the peripheral edge being formed in part by the light guide projection.

9. A flat panel display device comprising:

a mold frame which includes a groove having at least one rounded corner;

a light source mounted on the mold frame and operative to provide light;

a light guide panel on the mold frame in spaced apart relation from the light source, including a light guide projection mounted in the groove, the light guide projection having at least one rounded corner corresponding to the at least one rounded corner of the mold frame groove, the rounded corners of the mold frame groove and the light guide projection being cooperative to maintain the light guide panel and the light source in spaced relation, the at least one rounded corner of the light guide projection being operative to reduce concentration of the light in the light guide projection;

a display panel disposed on the light guide panel and positioned such that the light guide panel is interposed between the mold frame and the display panel.

10. A flat panel display device according to claim 9 further comprising a diffuser between the light guide panel and the display panel.

11. A flat panel display device according to claim 10 further comprising a printed circuit board on the mold frame, the printed circuit board being electrically connected to the display panel.

12. A flat panel display device according to claim 9:

wherein the mold frame groove and light guide panel both include a first corner, and a second corner which is spaced farther from the light source than the first corner is spaced from the light source;

wherein the first corners are angled and the second corners are rounded; and wherein the first corner of the light guide panel is disposed adjacent the first corner of the mold frame groove and the second corner of the light guide panel is disposed adjacent the second corner of the mold frame groove.

13. A flat panel display device according to claim 9 wherein the groove and light guide projection are both arcuate.

14. The flat panel display device according to claim 9 wherein the light guide panel defines a peripheral edge, the peripheral edge being formed in part by the light guide projection.

* * * * *